United States Patent
Seok et al.

(10) Patent No.: US 8,359,506 B2
(45) Date of Patent: Jan. 22, 2013

(54) METHOD OF TRANSMITTING DATA USING A PLURALITY OF HARQ PROCESS CHANNELS SEQUENTIALLY

(75) Inventors: Ji Ae Seok, Anyang-si (KR); Min Seok Oh, Anyang-si (KR); Ki Hyoung Cho, Anyang-si (KR); Young Seob Lee, Anyang-si (KR); So Yeon Kim, Anyang-si (KR); Ji Wook Chung, Anyang-si (KR); Seung Hyun Kang, Anyang-si (KR)

(73) Assignee: LG Electronics Inc., Seoul (KR)

( * ) Notice: Subject to any disclaimer, the term of this patent is extended or adjusted under 35 U.S.C. 154(b) by 803 days.

(21) Appl. No.: 12/450,104

(22) PCT Filed: Mar. 12, 2008

(86) PCT No.: PCT/KR2008/001396
§ 371 (c)(1),
(2), (4) Date: Sep. 11, 2009

(87) PCT Pub. No.: WO2008/111795
PCT Pub. Date: Sep. 18, 2008

(65) Prior Publication Data
US 2010/0115360 A1    May 6, 2010

(30) Foreign Application Priority Data
Mar. 14, 2007 (KR) .................. 10-2007-0025169

(51) Int. Cl.
*G08C 25/00* (2006.01)
*G08C 15/06* (2006.01)
(52) U.S. Cl. ......... 714/748; 714/749; 714/751; 370/229

(58) Field of Classification Search .................. 714/748, 714/749, 751; 370/216, 229, 235
See application file for complete search history.

(56) References Cited

U.S. PATENT DOCUMENTS

| | | | | |
|---|---|---|---|---|
| 6,693,910 | B2 * | 2/2004 | Chao | 370/394 |
| 7,430,206 | B2 * | 9/2008 | Terry et al. | 370/394 |
| 7,765,599 | B2 * | 7/2010 | Casas et al. | 726/26 |
| 7,783,949 | B2 * | 8/2010 | Lohr et al. | 714/751 |
| 7,974,243 | B2 * | 7/2011 | Nagata et al. | 370/334 |
| 8,102,805 | B2 * | 1/2012 | Goransson et al. | 370/329 |
| 2006/0291468 | A1 * | 12/2006 | Bopardikar et al. | 370/392 |
| 2009/0217118 | A1 * | 8/2009 | Miki et al. | 714/748 |

FOREIGN PATENT DOCUMENTS

| | | |
|---|---|---|
| EP | 1 594 246 A2 | 11/2005 |
| WO | WO 2004/030267 | 4/2004 |
| WO | WO 2007/105914 A1 | 9/2007 |

* cited by examiner

*Primary Examiner* — Joseph Schell
(74) *Attorney, Agent, or Firm* — McKenna, Long & Aldridge

(57) ABSTRACT

Methods of transmitting data using a plurality of hybrid automatic repeat request (HARQ) process channels sequentially is disclosed. One of the methods of transmitting data through a plurality of HARQ process channels including a first channel and a second channel includes adding offset to a retransmission data block if the first channel which will transmit the retransmission data block is prescheduled (S702) by another data block, the offset representing the difference in a transmission timing point between the second channel in which positive acknowledgement (ACK) signal has been received (S701) and the first channel; transmitting the retransmission data block through the second channel; and transmitting a data block corresponding to the second channel through the first channel.

17 Claims, 9 Drawing Sheets

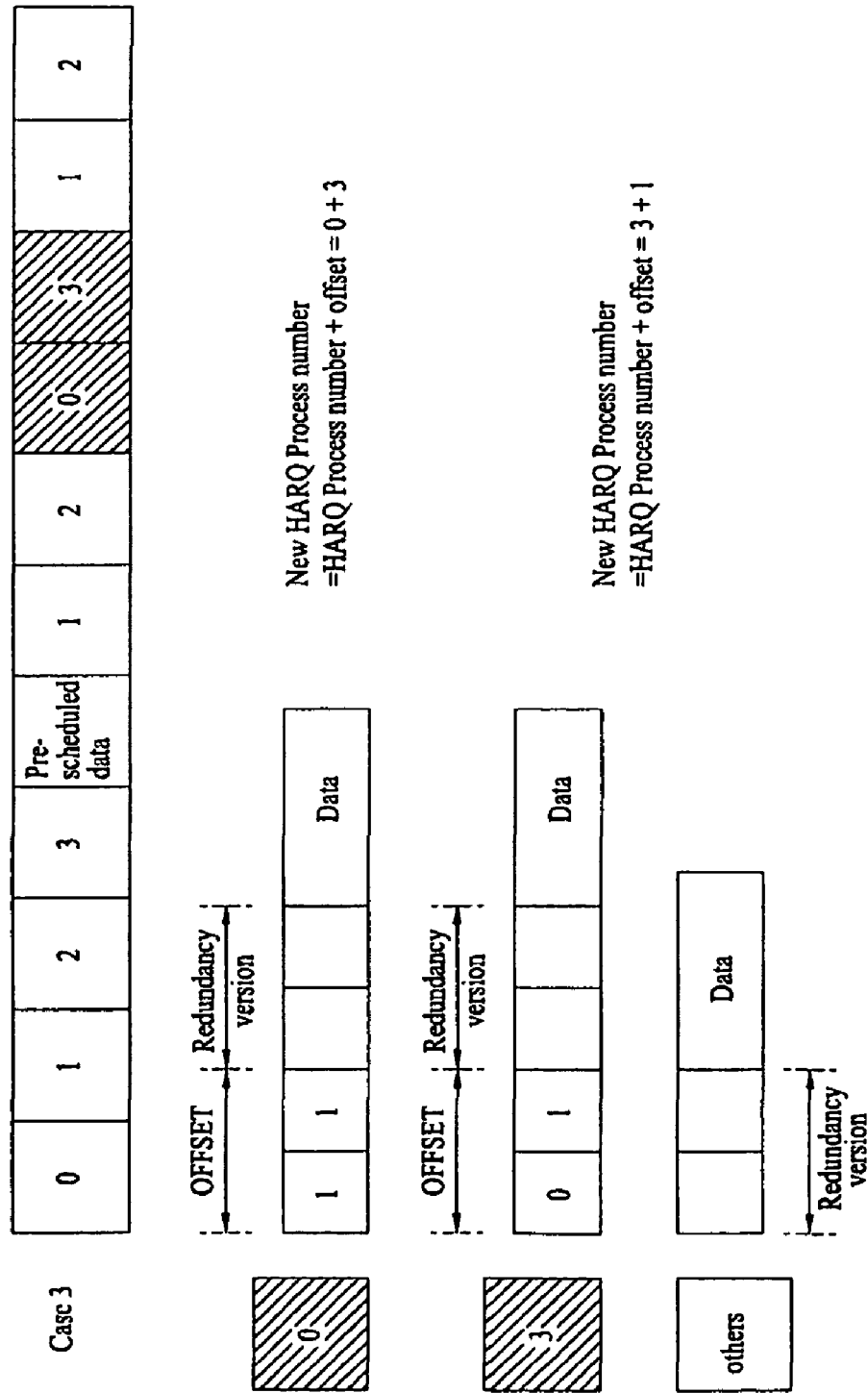

METHOD OF TRANSMITTING DATA USING A PLURALITY OF HARQ PROCESS CHANNELS SEQUENTIALLY

This application claims the benefit of PCT/KR2008/001396, filed on Mar. 12, 2008, which claims priority to Korean Patent Application No. 10-2007-0025169, filed on Mar. 14, 2007, both of which are incorporated by reference for all purposes, as if fully set forth herein

TECHNICAL FIELD

The present invention relates to an error control algorithm, and more particularly, to a method of transmitting data using a plurality of HARQ process channels sequentially.

BACKGROUND ART

An error control algorithm can be classified into two types of schemes, i.e., an automatic repeat request (ARQ) scheme and a forward error correction (FEC) scheme.

Examples of the ARQ scheme include a Stop and Wait ARQ scheme, a Go-Back-N ARQ scheme, and a Selective-Repeat ARQ scheme.

The Stop and Wait ARQ scheme is to transmit next frame after acknowledging whether a previous frame has been exactly received (acknowledging through ACK signal). Also, the Go-Back-N ARQ scheme is to transmit N number of successive frames, and to retransmit all the data frames, which are transmitted after an error has occurred, if the N number of successive frames have not been transmitted successfully. The Selective-Repeat ARQ scheme is to selectively retransmit frames only in which an error has occurred.

A Hybrid Automatic Repeat reQuest (HARQ) scheme is to control an error by combining an ARQ scheme with a forward error correction (FEC) scheme, and maximizes error correction coding capability of data received during retransmission.

The HARQ scheme is classified into a chase combining scheme and an incremental redundancy scheme depending on characteristics of bits transmitted during retransmission.

The chase combining scheme (hereinafter, referred to as 'CC scheme') is to retransmit data used for first transmission to increase a signal to noise ratio (SNR) of a receiver, thereby obtaining gain.

The incremental redundancy scheme (hereinafter, referred to as 'IR scheme') transmits some of parity bits in a different mode during retransmission. In this case, a coding rate can be controlled depending on parity bits which are retransmitted. Since the receiver combines the transmitted data, it obtains coding gain, thereby obtaining improved performance.

The HARQ scheme can be classified into a Synchronous HARQ scheme and an asynchronous HARQ scheme depending on a scheduling scheme of a transmitter.

The transmitter which depends on the synchronous HARQ scheme transmits data using resources, which are previously defined, at the time when both the transmitter and the receiver know. Accordingly, the synchronous HARQ scheme does not need signaling required for transmission, for example, a HARQ process number for identifying data.

Meanwhile, the asynchronous HARQ scheme is to allocate and transmit radio resources for data transmission at a random time. Accordingly, since the asynchronous HARQ scheme includes signaling required for data transmission, for example, a HARQ process number, signaling overhead increases.

The synchronous HARQ scheme and/or the asynchronous HARQ scheme are used in various communication systems.

Hereinafter, a 3GPP LTE (Long Term Evolution) system which is an example of the various communication systems will be described.

Table 1 illustrates an example of signaling for supporting HARQ defined in 3GPP TR25.814.

TABLE 1

| | Field | Size | Comment |
|---|---|---|---|
| If asynchronous hybrid ARQ is adopted | Hybrid ARQ process number | 3 | Indicates the hybrid ARQ process the current transmission is addressing. |
| | Redundancy version | 2 | To support incremental redundancy. |
| | New data indicator | 1 | To handle soft buffer clearing. |
| If synchronous hybrid ARQ is adopted | Retransmission sequence number | 2 | Used to derive redundancy version (to support incremental redundancy) and 'new data indicator' (to handle soft buffer clearing). |

If the asynchronous HARQ scheme is adopted, a HARQ process number of 3 bits, a redundancy version of 2 bits, and a new data indicator of 1 bit are used.

FIG. 1 is a block diagram illustrating signaling of Table 1.

As shown in FIG. 1, if the asynchronous HARQ scheme is adopted, additional signaling is forwarded along with a data block. In other words, three types of signaling marked in Table 1 are added to the data block.

The HARQ process number is information for identifying a HARQ process block where transmission is currently performed. The HARQ process block is a data unit where an error can be detected and transmission and reception are performed in such a manner that information as to whether an error has occurred with respect to information received in the receiver is sent to the transmitter.

The redundancy version of 2 bits is information for identifying a pattern of codewords transmitted when the IR scheme is adopted. As described above, the IR scheme is to retransmit some of the parity bits and information bits constituting codewords. In other words, if retransmission is performed, previous bits and other bits can be retransmitted. Accordingly, if same bits are transmitted in accordance with the IR scheme, since this transmission scheme may be based on the CC scheme, the CC scheme could be referred to as a special IR scheme. In this case, bits used for transmission can be identified by specific index information. The redundancy version is information for identifying bits used for transmission.

The new data indicator of 1 bit is an indicator for identifying retransmission from first transmission. If retransmission is performed, the receiver combines data stored in a buffer with retransmitted data and demodulates the combined data. If first transmission is performed, the receiver can clear a memory stored in the buffer.

Meanwhile, if the synchronous HARQ scheme is adopted, a retransmission sequence number of 2 bits is used. It is possible to support the redundancy version and the new data indicator through the retransmission sequence number.

Hereinafter, features and problems of the aforementioned HARQ scheme according to the related art will be described.

FIG. 2 is a block diagram illustrating action of the 'Stop-and-wait HARQ' scheme.

Stop-and-wait HARQ protocol, i.e., Stop-and-wait HARQ scheme is a transmission method which is the simplest and efficient. As shown in FIG. 2, the transmitter transmits one HARQ process block to the receiver. According to the action of the stop-and-wait HARQ scheme, the receiver transmits a HARQ feedback signal to the transmitter, which identifies ACK or NACK, and then the transmitter determines whether to transmit new data or to retransmit current data. However, link transmission efficiency is deteriorated due to a rounding trip time (RTT) required for the transmitter to transmit and receive ACK (ACKnowledgement)/NACK (Negative ACK) to and from the receiver.

FIG. 3 is a block diagram illustrating action of the 'Stop-and-wait HARQ' scheme which uses N number of channels.

To improve the related art, the 'Stop-and-wait HARQ' scheme which uses N number of channels uses several (N number) independent channels for the time when a transmission link is not used until the ACK/NACK signals are transmitted and received, thereby preventing link transmission efficiency from being deteriorated due to RTT.

According to the scheme of FIG. 3, the transmitter transmits data to the receiver. And, the receiver transmits a HARQ feedback signal to the transmitter, which identifies ACK or NACK, and then the transmitter determines whether to transmit new data or to retransmit the current data. In this case, N number of independent HARQ process channels are operated.

Data for voice over Internet protocol (VoIP), for example, like persistent scheduled data, can be allocated with resources with priority as compared with other data. When the synchronous HARQ scheme is adopted, if data to be transmitted are not transmitted by data such as VoIP at the time when the data should be transmitted, their transmission timing point will be lost. In this case, since latency equivalent to a multiple number of the RTT occurs, system efficiency is deteriorated.

DESCRIPTION OF THE INVENTION

Technical Problems

Accordingly, the present invention is directed to a method of transmitting data using a plurality of HARQ process channels sequentially, which substantially obviates one or more problems due to limitations and disadvantages of the related art. An object of the present invention is to provide a method of transmitting data using a plurality of HARQ process channels sequentially, in which the plurality of HARQ process channels have improved performance with short latency.

Technical Solutions

To achieve these objects and other advantages and in accordance with the purpose of the invention, as embodied and broadly described herein, a method of transmitting data through a plurality of hybrid automatic repeat request (HARQ) process channels including a first channel and a second channel includes adding offset to a retransmission data block if the first channel which will transmit the retransmission data block is prescheduled by another data block, the offset representing the difference in a transmission timing point between the second channel in which ACK signal has been received and the first channel; transmitting the retransmission data block through the second channel; and transmitting a data block corresponding to the second channel through the first channel.

Preferably, the retransmission data block includes offset to the second channel based on the first channel.

Preferably, the data block corresponding to the second channel includes offset to the first channel based on the second channel.

In another aspect of the present invention, a method of transmitting data through a plurality of HARQ process channels by allocating N number of HARQ process numbers includes adding offset to a retransmission data block if NACK signal to a kth frame is received and a prescheduled data block exists in a HARQ process channel corresponding to the kth frame, the offset representing the difference in a transmission timing point between a (k+i)th frame in which ACK signal has been received and the kth frame; transmitting the retransmission data block to a receiver by allocating the retransmission data block to a HARQ process number corresponding to the (k+i)th frame; and transmitting the (k+i)th frame to the receiver by allocating the (k+i)th frame to a HARQ process number corresponding to the kth frame.

Preferably, the step of transmitting the retransmission data block includes allocating a HARQ process number to the retransmission data block, the HARQ process number corresponding to the remainder value obtained by dividing k by N.

Preferably, the step of transmitting the (k+i)th frame includes allocating a HARQ process number to the (k+i)th frame, the HARQ process number corresponding to the remainder value obtained by dividing (k+i) by N.

Preferably, the step of adding offset includes adding a field for the offset to any one HARQ control information element of a synchronous HARQ downlink MAP information element or a synchronous HARQ uplink MAP information element.

Preferably, the step of adding offset includes adding a field for the offset to a format for allocation of an uplink shared channel (UL-SCH) in a 3GPP LTE system.

The embodiments of the present invention are preferably applied to a communication system which uses a plurality of HARQ process channels sequentially.

For example, if N number of channels are sequentially used, a transmitter transmits data using HARQ process channel numbers 1 to N. In this case, a data block corresponding to the HARQ process channel number 1, i.e., a data block having a frame number '1' is transmitted through the HARQ process channel number 1. Also, a data block corresponding to the HARQ process channel number N, i.e., a data block having a frame number 'N' is transmitted through the HARQ process channel number N. If the HARQ process channel numbers 1 to N have been used sequentially, the HARQ process channel number 1 is used again. In this case, a data block corresponding to the HARQ process channel number 1, i.e., a data block having a frame number 'N+1' is transmitted through the HARQ process channel number 1. The aforementioned action is repeated.

The embodiments of the present invention are preferably used in a system to which a synchronous HARQ scheme is applied, because a lot of overhead exists in an asynchronous HARQ scheme.

In the embodiments of the present invention, if data such as VoIP are prescheduled, offset is added to a data block to efficiently transmit data.

The embodiments of the present invention suggest that a retransmission timing point of data should be adjusted again when other data are prescheduled at a given retransmission timing point of data in adopting a synchronous HARQ scheme. In this case, latency is reduced and system efficiency is enhanced.

Advantageous Effects

According to the embodiments of the present invention, since an offset signal is added to the synchronous HARQ scheme, flexibility is given to resource allocation without great increase of overhead with respect to a control signal, whereby resources can be used efficiently.

In addition, the action of the synchronous HARQ scheme is performed by a multiple number of a round trip time (RTT). According to the embodiments of the present invention, latency time can be shortened in the range of less than RTT, unlike the related art in which minimum latency time is greater than RTT when prescheduled data occur.

BRIEF DESCRIPTION OF THE DRAWINGS

FIG. 5 to FIG. 9 are block diagrams illustrating actions of a transmitter according to the embodiments of the present invention.

BEST MODE FOR CARRYING OUT THE INVENTION

Reference will now be made in detail to the preferred embodiments of the present invention, examples of which are illustrated in the accompanying drawings. However, it will be apparent to those skilled in the art that various modifications and variations can be made in the following embodiments of the present invention, and the scope of the present invention is not limited to the following embodiments.

A transmitter and a receiver previously know data with high priority, for example data prescheduled for transmission of multiple broadcast multicast service (MBMS) and persistent scheduled data, through a scheme suitable for a system. The transmitter is operated in accordance with a synchronous HARQ scheme when retransmission is requested from the receiver as an error occurs in transmitted data (x). If another data (y) are prescheduled at a given timing point (t1), it is preferable to transmit the data (x) at a first transmission timing point (t2) not a retransmission timing point of each frame among several timing points of the transmitter. In this case, even in case that the data 'x' are transmitted at the timing point 't2,' it is possible to identify whether the data are first data or retransmission data, which are transmitted through a redundancy version or a new data indicator, in accordance with a scheme applied to the system.

However, according to the related art, since its HARQ process number is determined based on a frame number, its HARQ process number will be changed. Accordingly, in the present invention, a method for offset compensation to maintain a HARQ process number of the transmitter even if a frame number is changed is used. Examples of resources which can be used for the offset compensation include time, frequency, and so on.

Figure 1:
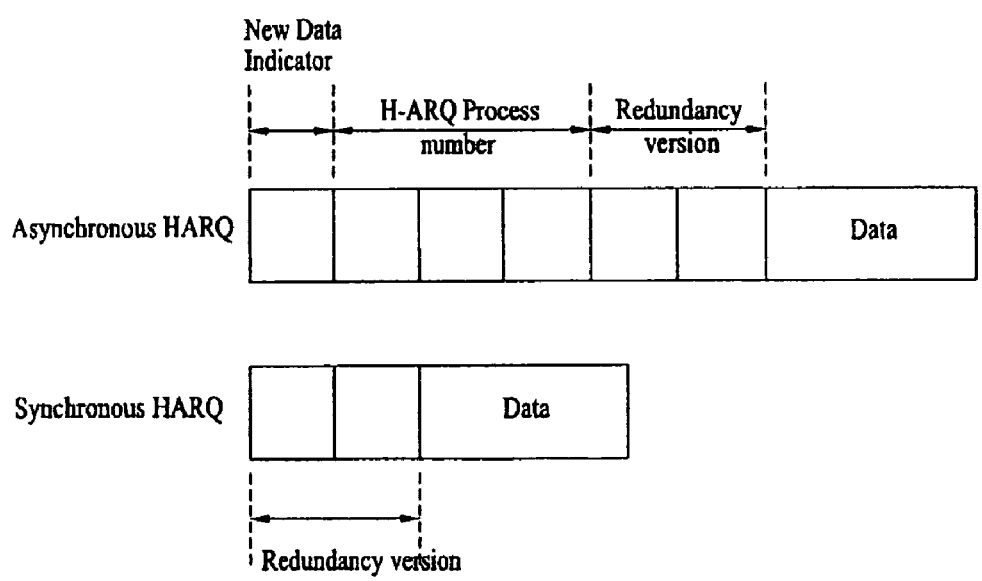
FIG. 1 is a block diagram illustrating signaling of Table 1.
Figure 2:
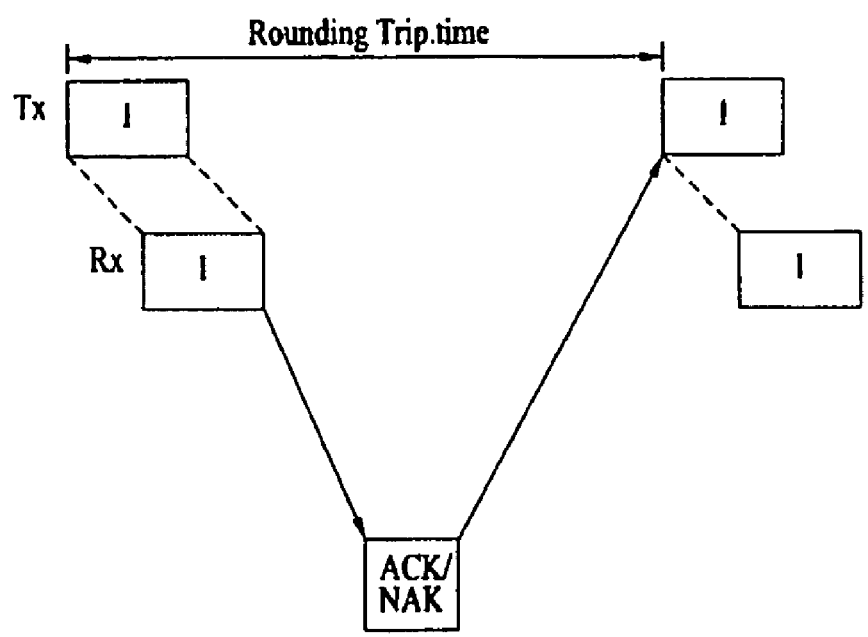
FIG. 2 is a block diagram illustrating action of a 'Stop-and-wait HARQ' scheme.
Figure 3:
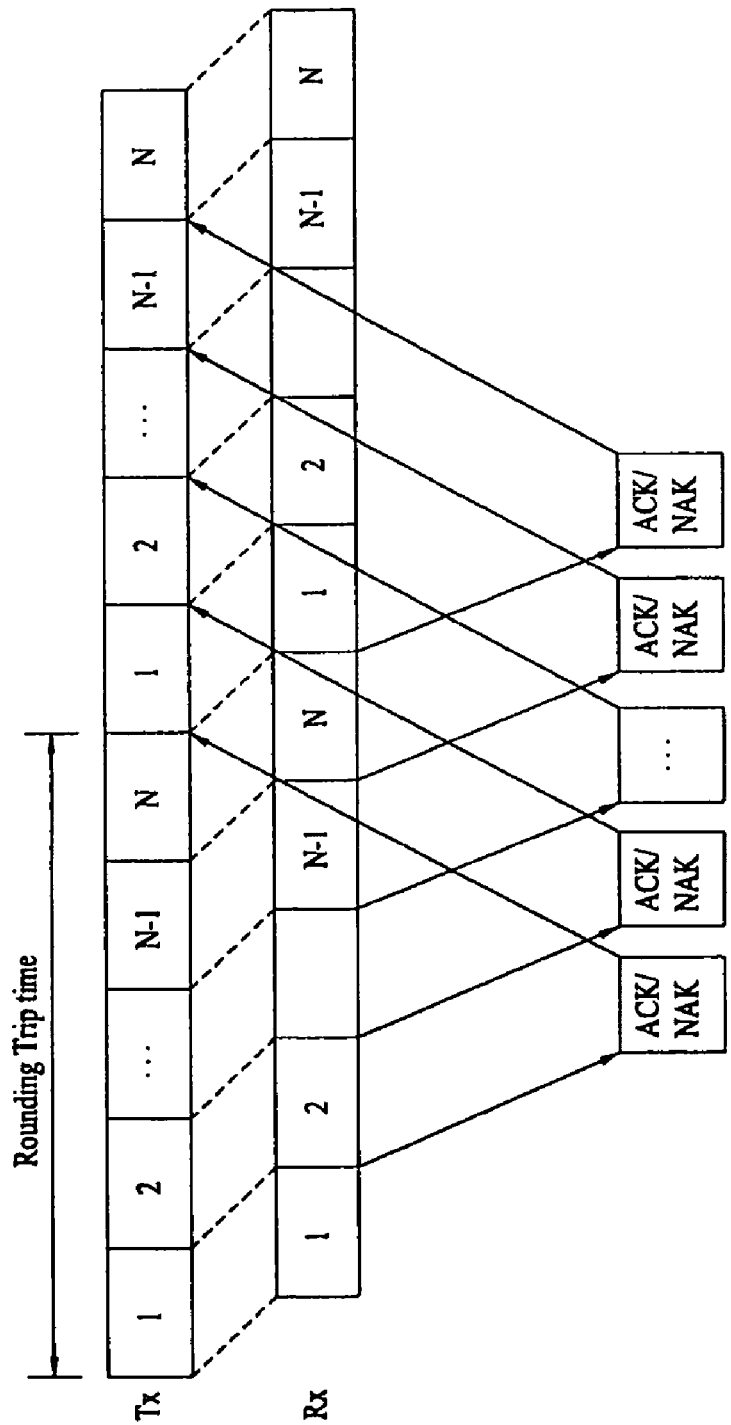
FIG. 3 is a block diagram illustrating action of a 'Stop-and-wait HARQ' scheme which uses N number of channels.
Figure 4:
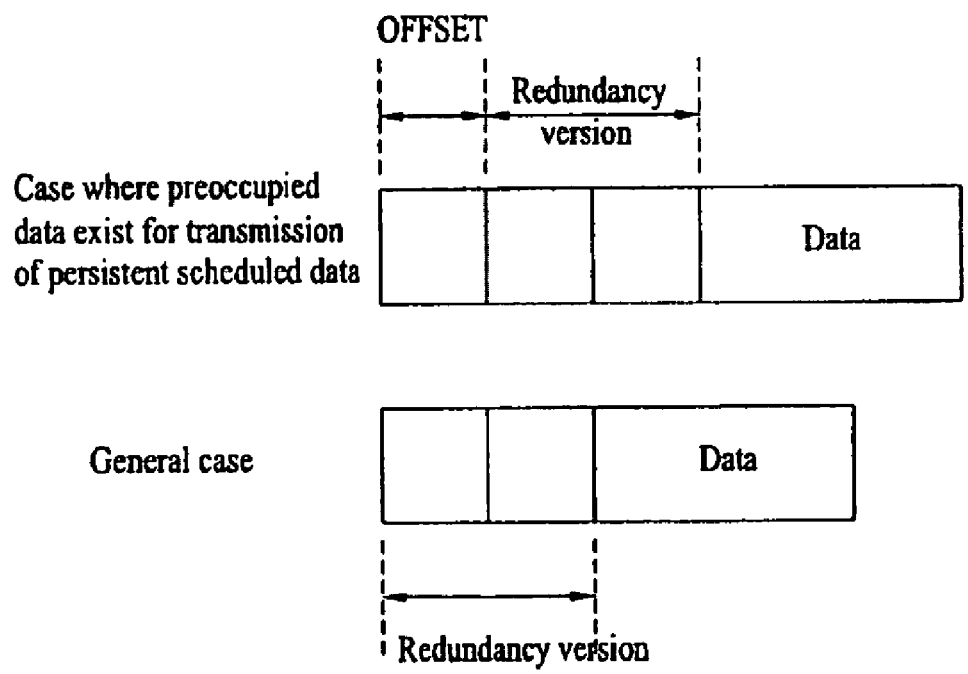
FIG. 4 illustrates data blocks corresponding to a case where resources are prescheduled to transmit data with high priority, for example, persistent scheduled data and a case where the resources are not prescheduled.

FIG. 4 illustrates data blocks corresponding to a case where resources are prescheduled to transmit data with high priority, for example, persistent scheduled data and a case where the resources are not prescheduled.

As shown, if the resources are prescheduled to transmit data with high priority, offset of a variable size is preferably included in the data block. There is no limitation in a position where the offset is added.

Table 2 illustrates an example of a position where offset is added to a HARQ control information element (HARQ_Control_IE) in IEEE 802.16e or IEEE 802.16m.

TABLE 2

| Syntax | Size | Notes |
| --- | --- | --- |
| HARQ_Control_IE ( ) { | — | — |
| Prefix | 1 bit | 0 = Temporary disable HARQ<br>1 = enable HARQ |
| if (Prefix == 1) { | — | — |
| AI_SN | 1 bit | HARQ ID seq. No |
| SPID/Reserved | 2 bits | Subpacket ID when IR is defined by the FEC mode, otherwise reserved (encoded 0b00) |
| ACID | 4 bits | HARQ CHID |
| Offset | Variable | Change of transmission timing point of retransmission data block with respect to HARQ process (original transmission timing point) of prescheduled data block |
| } else { | — | — |
| Reserved | 3 bits | Shall be set to zero |
| } | — | — |
| } | — | — |

The HARQ control information element (HARQ_Control_IE) is arranged in a compact DL/UL MAP information element (Compact DL/UL MAP_IE).

In Table 2, prefix represents whether HARQ is enabled. AI_SN performs a function of a new data indicator, and SPID means a redundancy version of a retransmission packet transmitted through HARQ process. ACID corresponds to a HARQ process number. Although offset may be variable in order to reduce overhead, the offset is not limited to such a variable offset.

In particular, in case of a synchronous HARQ process, offset only may be used and ACID may be omitted as illustrated in Table 3.

TABLE 3

| Syntax | Size | Notes |
| --- | --- | --- |
| HARQ_Control_IE ( ) { | — | — |
| Prefix | 1 bit | 0 = Temporary disable HARQ<br>1 = enable HARQ |
| if (Prefix == 1) { | — | — |
| AI_SN | 1 bit | HARQ ID seq. No |
| SPID/Reserved | 2 bits | Subpacket ID when IR is defined by the FEC mode, otherwise reserved (encoded 0b00) |
| Offset | Variable | Change of transmission timing point of retransmission data block with respect to HARQ process (original transmission timing point) of prescheduled data block |
| } else { | — | — |
| Reserved | 3 bits | Shall be set to zero |
| } | — | — |
| } | — | — |

Table 4 illustrates a position where offset is added to a format used for allocation of an uplink shared channel (UL-SCH) in a 3GPP LTE system.

TABLE 4

| Field | Bits |
| --- | --- |
| CRC/UEID | 16-20 |
| Format | 1 |
| RB assignment | $\lceil \log_2(N_{RB}^{UL}(N_{RB}^{UL}+1)/2) \rceil$ |
| Transport format | [5] |
| Retransmission sequence number (RSN) | 2 |
| Offset | Variable |
| TPC command for scheduled PUSCH | 2 |
| Cyclic shift for DMRS | 3 |
| Frequency hopping information | 1 |
| Tx antenna selection | [0-1] |
| Total in 5 MHz Bandwidth | Max: 44 |

The format of Table 4 is related to a physical uplink control channel (PUCCH). MAC ID is encoded inherently in the CRC. A resource block assignment filed is related to the number of bits required for allocation of resource blocks, and depends on an uplink system bandwidth. A transport format field is required to select a modulation and coding scheme. RSN field includes functions of a new data indicator and a redundancy version. Although offset may be variable to reduce overhead in Table 4, the offset is not limited to such a variable offset.

The offset is information for identifying the original transmission timing point (t1) from the actual transmission timing point (t2). Since N number of HARQ process channels are used in the embodiments of the present invention, whether the data are transmitted through what HARQ process channel can be identified through the offset. In other words, if data to be transmitted through the HARQ process channel number 1 are transmitted through the HARQ process channel number 4, it is possible to indicate the transmitted HARQ process channel through offset of '+3.'

If there are provided a plurality of HARQ process channels and data are transmitted through different HARQ process channels, data transmission can be performed at different timing points. In other words, the offset can indicate a transmission timing point when the data block is transmitted while indicating the HARQ process channel where transmission is performed.

The transmitter can change a timing point when the data block is transmitted using a control signal such as offset, if VoIP occurs or other various reasons occur. At this time, it is preferable to efficiently control offset bits depending on system characteristics.

For example, if the 'stop and wait HARQ' scheme which uses N number of HARQ process channels is adopted, offset bits could be greater than or equal to $\log_2 N$.

TABLE 5

| | N | | | | | | | | |
| --- | --- | --- | --- | --- | --- | --- | --- | --- | --- |
| | 1 | 2 | 3 | 4 | 5 | 6 | 7 | 8 | 9 |
| Offset bits | 0 | 1 | 2 | 2 | 3 | 3 | 3 | 3 | 4 |

Table 5 illustrates relation between N which is the number of HARQ process channels and offset bits. Table 5 is only an example of offset bits, and the offset bits can be controlled variably.

Figure 5:
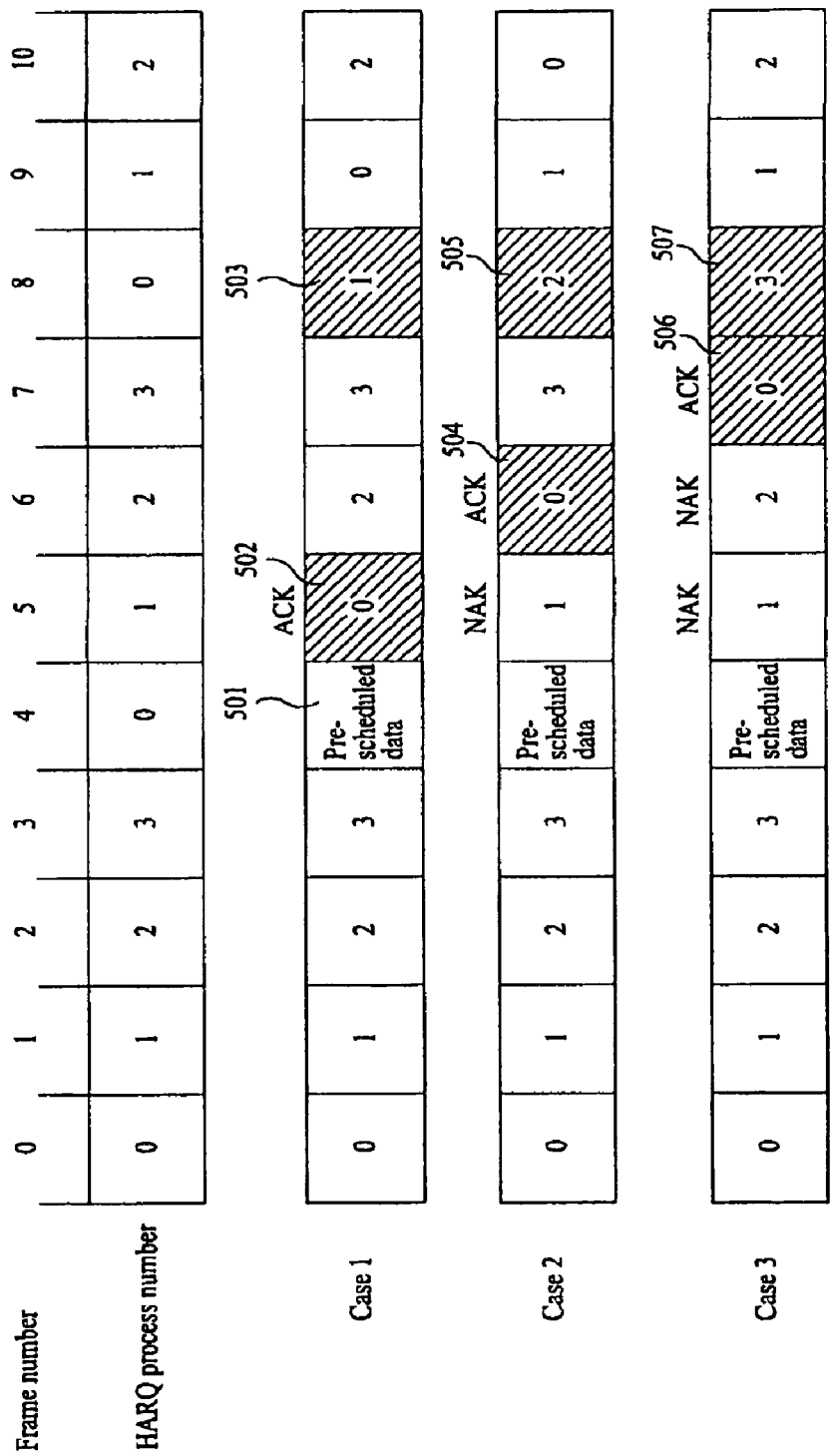

FIG. 5 is a block diagram illustrating the action of the transmitter according to the embodiments of the present invention.

A frame number shown in FIG. 5 is a sequence number for identifying data blocks which are transmitted.

As shown in FIG. 5, the transmitter can transmit the data blocks using four (=N) HARQ process channels. A HARQ process number shown in FIG. 5 is determined depending on the relation of the following Equation 1. Equation 1 is an example where the receiver leads a sequence number transmitted from the transmitter in the synchronous HARQ scheme.

Frame number modulo N=HARQ process number [Equation 1]

In accordance with the Equation 1 above, frame numbers '0, 4, 8' are transmitted through the HARQ process channel number '0' and frame numbers '1, 5, 9' are transmitted through the HARQ process channel number '1.' Also, frame numbers '2, 6, 10' are transmitted through the HARQ process channel number '2' and frame numbers '3, 7' are transmitted through the HARQ process channel number '3.' In other words, four HARQ process channels (HARQ process channel numbers 0 to 3) are sequentially used. Furthermore, the frame 'x' means a data block transmitted when a frame number is x.

Meanwhile, various situations occur if the resources are prescheduled. FIG. 5 illustrates the action of the transmitter at three different situations.

First of all, the action of the transmitter in case of 'Case 1' of FIG. 5 will be described. The transmitter transmits data by sequentially using the HARQ process channels. However, since a resource 501 is prescheduled with respect to the frame number '4,' the data block corresponding to the HARQ process number '0' cannot be transmitted. Namely, a data block 502 to be transmitted through the HARQ process channel number '0' cannot be transmitted due to data such as VoIP.

In this case, the data block 502 to be transmitted through the HARQ process channel number '0' can be transmitted through the frame number '8' without being transmitted through the frame number '4.' For this reason, a problem occurs in that latency in transmission of the data block 502 occurs, wherein the latency is equivalent to RTT (corresponding to four frames).

Accordingly, the embodiments of the present invention suggest the following method. The transmitter according to the embodiments of the present invention transmits the data block 502 corresponding to the HARQ process number '0' by using a frame in which ACK signal has been received. In case of the 'Case 1,' since the ACK signal has been received in the frame number '5,' the transmitter transmits the data block 502 corresponding to the HARQ process number '0' to the frame number '5.'

In this case, since transmission of a data block 503 to be transmitted through the frame number '5' may be delayed, the transmitter transmits the data block 503, which is to be transmitted through the frame number '5,' through the frame number '8' corresponding to the HARQ process channel number '0.'

The transmitter according to the embodiments of the present invention repeats the aforementioned action. Accordingly, the HARQ process number '0' is allocated to the frame number '9,' the HARQ process number '2' is allocated to the frame number '10,' the HARQ process number '3' is allocated to the frame number '11' (not shown), and the HARQ process number '1' is allocated to the frame number '12' (not shown).

In short, if the transmitter fails to transmit data (d1) to be transmitted through a specific first HARQ process channel, the transmitter transmits the data through a specific second HARQ process channel. In this case, the second HARQ process channel is preferably determined by the channel of the frame which has received the ACK signal from the receiver. Since retransmission not first transmission should be performed in the HARQ process channel which has received the NACK signal, the channel which has received the ACK signal is preferably determined as the second HARQ process channel. If the transmitter transmits the data (d1), which is to be transmitted through the first HARQ process channel, through the second HARQ process channel, transmission of data (d2) intended to be transmitted through the second HARQ process channel may be delayed. In this case, the transmitter preferably transmits the data (d2), which is intended to be transmitted through the second HARQ process channel, through the first HARQ process channel.

Figure 6:
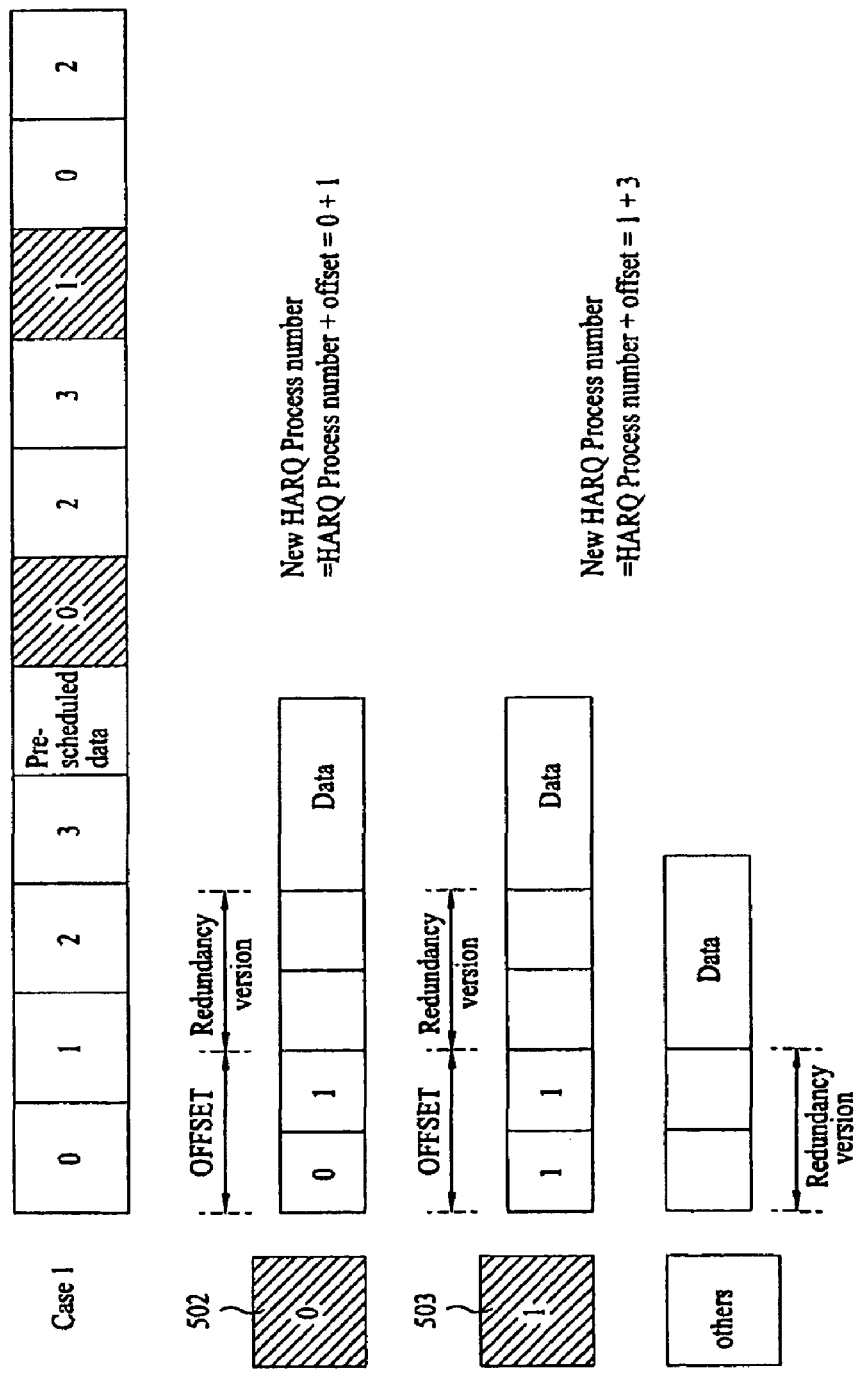

FIG. 6 is a block diagram illustrating offset added in case of the 'Case 1.'

As described above, the transmitter performs retransmission as it receives the NACK signal from the receiver which has received the data from the transmitter. In this case, if the resources to be used for retransmission are prescheduled by other data, the transmitter gives offset at the timing point when the data will be retransmitted, and changes a possible transmission timing point, thereby transmitting the data in accordance with the synchronous HARQ scheme. In this case, it is preferable that a timing point when first transmission not retransmission is performed becomes the changed transmission timing point. Namely, it is preferable that the timing point when the ACK signal has been received becomes the changed transmission timing point.

The offset included in the first data block 502 of FIG. 6 is '+1.' This is because that the transmission timing point of the data block 502 has been changed by '+1' in accordance with FIG. 5.

Also, the offset included in the second data block 503 of FIG. 6 is '+3.' This is because that the transmission timing point of the data block 503 has been changed by '+3.'

Since the transmitter and the receiver are synchronized with each other, the receiver can learn the HARQ process number actually transmitted from the HARQ process number determined based on the frame number using the Equation 1 and the offset. A value obtained by taking an absolute value with respect to a value obtained by subtracting an offset value from the HARQ process number determined based on the frame number in the receiver is a HARQ process number which is actually transmitted. In other words, the relation of 'actually transmitted HARQ process number=|(frame number modulo N of receiver)−offset|' is made.

As shown, since the other data blocks except for the two data blocks 502 and 503 do not need offset, they do not include offset.

Figure 7:
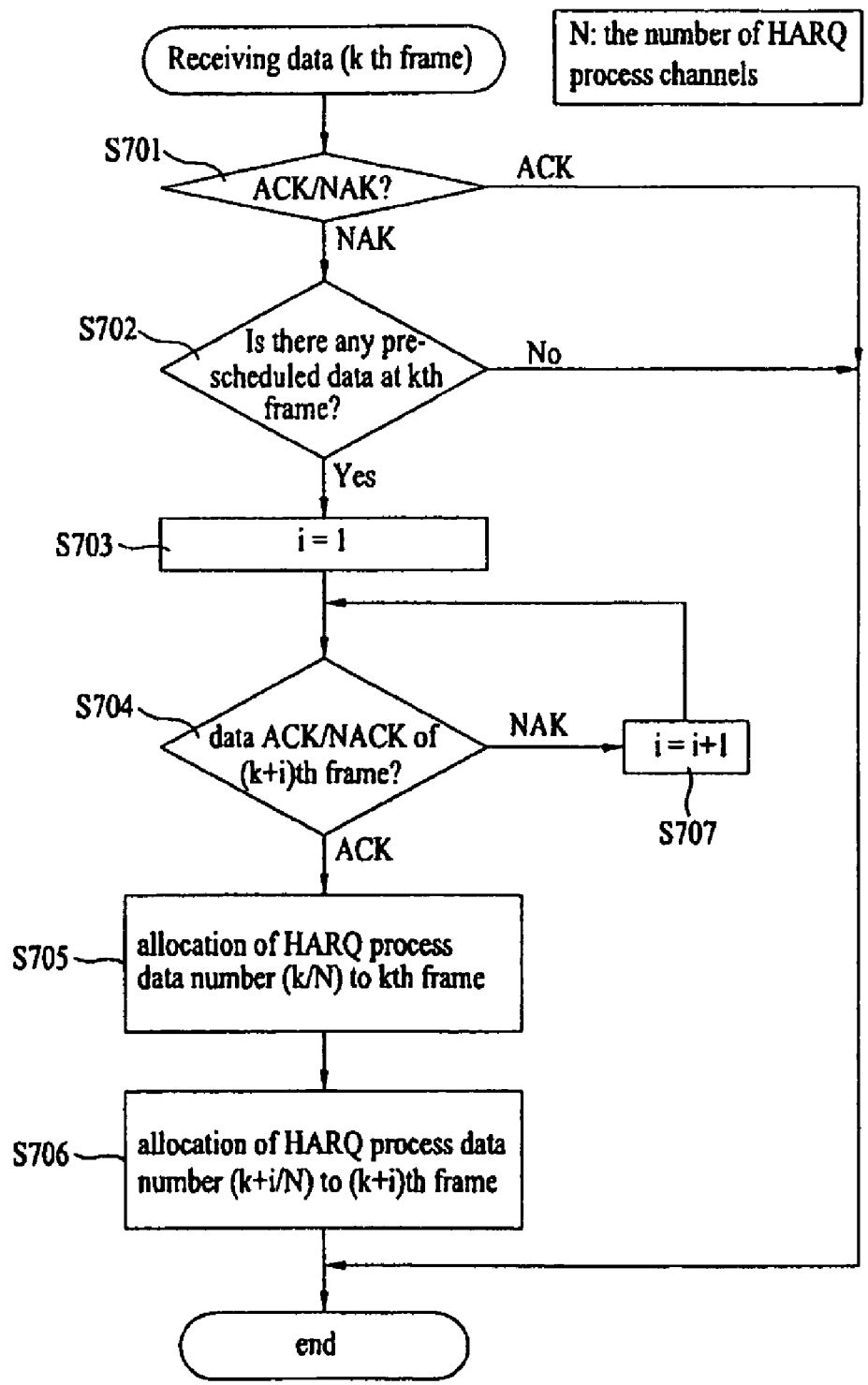

FIG. 7 is a flow chart illustrating the action of the transmitter according to the embodiments of the present invention. First of all, it is determined whether the ACK or NACK signal has been received from the receiver with respect to the kth frame (S701). If the NACK signal has been received through S701, the embodiments of the present invention are preferably adopted.

Afterwards, it is determined whether there are pre-scheduled data (S702). If data such as VoIP are pre-scheduled, steps starting from S703 are performed.

After a parameter is initiated (S703), it is determined whether the ACK or NACK signal has been received in next frame of a corresponding frame. If the next frame corresponds to the frame where the NACK signal has been received, the action of steps S704 and S705 is repeated until the frame where the ACK signal has been received appears.

If there is a frame ((k+i)th frame) where the ACK signal has been received, a HARQ process number 'k module N' is allocated to the corresponding frame (kth frame) (S705). Namely, an offset value is given to the corresponding frame. This step S705 corresponds to the action of moving the first data block 502 in FIG. 6.

After the step S705, a HARQ process number '(k+i) module N' is allocated to the (k+i)th frame (S706). Namely, an offset value is given to the (k+i)th frame. This step S706 corresponds to the action of moving the second data block 503 in FIG. 6.

In addition to the aforementioned example, there may be various cases.

Figure 8:
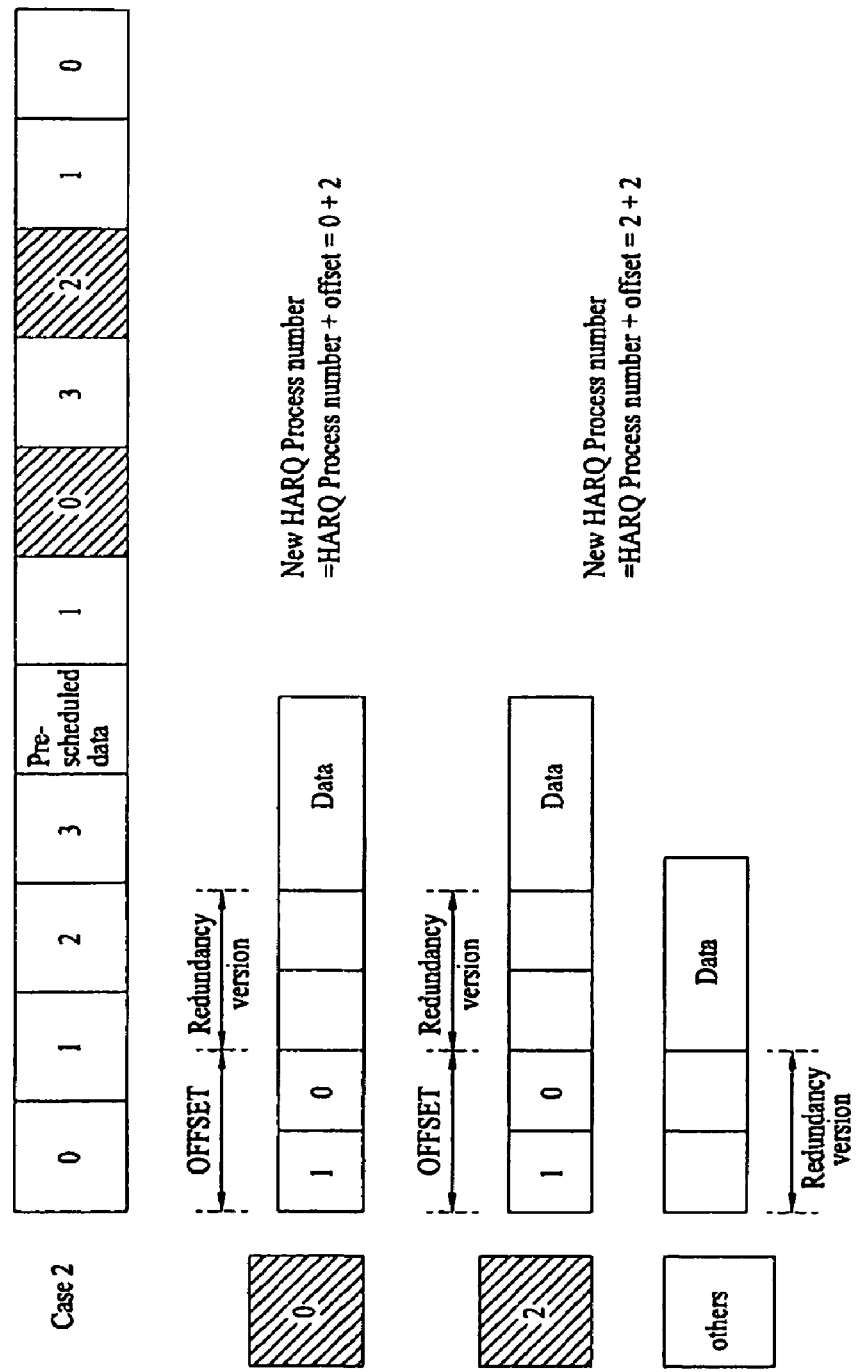

Hereinafter, 'Case 2' of FIG. 5 will be described with reference to FIG. 8. Referring to FIG. 5 and FIG. 8, the ACK signal is received in the frame number '6.' In this case, the first data block 504 is transmitted through the frame number '6.' In this case, since the data block has been moved by two frames, offset with respect to the first data block 504 is determined as '+2.'

Also, the second data block 505 is transmitted through the frame number '8.' In this case, since the data block has been moved by two frames, offset with respect to the second data block 505 is determined as '+2.'

Hereinafter, 'Case 3' of FIG. 5 will be described with reference to FIG. 9. Referring to FIG. 9, the ACK signal is received in the frame number '7.' In this case, the first data block 506 is transmitted through the frame number '7.' In this case, since the data block has been moved by three frames, offset with respect to the first data block 506 is determined as '+3.'

Also, the second data block 507 is transmitted through the frame number '8.' In this case, since the data block has been moved by one frame, offset with respect to the second data block 507 is determined as '+1.'

The aforementioned method can be applied to a communication system which uses a plurality of orthogonal carriers.

Examples of the communication system include an orthogonal frequency division multiplexing (OFDM) system, an orthogonal frequency division multiple access (OFDMA) system, and a single carrier-FDMA (SC-FDMA) system.

The aforementioned systems transmit data using a plurality of sub-carriers for one time slot through inverse fast fourier transform (IFFT) or inverse discrete fourier transform (IDFT). Data transmitted for one time slot are referred to as OFDM symbols. One OFDM symbol is generated in accordance with the IFFT or IDFT.

User data or control information can be transmitted using the OFDM symbols. In this case, data are transmitted for the unit of x number of OFDM symbols, of which first y number of OFDM symbols can be transmitted as control information and the other x-y number of OFDM symbols can be transmitted as data information.

Since offset information according to the embodiments of the present invention belongs to control information, it is preferable that the offset information is included in the first y number of OFDM symbols. It is also preferable that control information such as the redundancy version is included in the first y number of OFDM symbols. In this case, it is preferable that the other user data except for the control information are transmitted to the other OFDM symbols.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention relates to a method of transmitting data using a plurality of HARQ process channels sequentially, which can obtain improved performance with short latency. The present invention can be applied to a base station, a relay station, and a mobile station, which perform HARQ action in a system such as IEEE 802.16e, IEEE 802.16m, and 3GPP LTE.

What is claimed is:

1. A method of transmitting data through a plurality of hybrid automatic repeat request (HARQ) process channels including a first channel and a second channel, the method comprising:

adding offset to a retransmission data block if the first channel which will transmit the retransmission data block is prescheduled by another data block, the offset representing a difference in a transmission timing point between the second channel in which an ACK signal has been received and the first channel;

transmitting the retransmission data block through the second channel; and transmitting a data block corresponding to the second channel through the first channel.

2. The method of claim 1, wherein the step of adding offset includes adding a field for the offset to any one HARQ control information element of a synchronous HARQ downlink MAP information element or a synchronous HARQ uplink MAP information element.

3. The method of claim 1, wherein the step of adding offset includes adding a field for the offset to a format for allocation of an uplink shared channel (UL-SCH) in a 3GPP LTE system.

4. The method of claim 1, wherein the retransmission data block is determined by persistent scheduling.

5. The method of claim 1, wherein the retransmission data block is a voice over Internet protocol (VoIP) packet.

6. The method of claim 1, wherein the retransmission data block includes offset to the second channel based on the first channel.

7. The method of claim 1, wherein the data block corresponding to the second channel includes offset to the first channel based on the second channel.

8. The method of claim 1, wherein the offset is a number of frames corresponding to the difference in a transmission timing point.

9. The method of claim 1, wherein the offset has a variable number of bits.

10. A method of transmitting data through a plurality of HARQ process channels by allocating N number of HARQ process numbers, the method comprising:

adding offset to a retransmission data block if a NACK signal to a kth frame is received and a prescheduled data block exists in a HARQ process channel corresponding to the kth frame, the offset representing the difference in a transmission timing point between a (k+i)th frame in which an ACK signal has been received and the kth frame;

transmitting the retransmission data block to a receiver by allocating the retransmission data block to a HARQ process number corresponding to the (k+i)th frame; and transmitting the (k+i)th frame to the receiver by allocating the (k+i)th frame to a HARQ process number corresponding to the kth frame.

11. The method of claim 10, wherein the step of adding offset to a retransmission data block includes increasing i until there exists a frame in which an ACK signal has been received.

12. The method of claim 10, wherein the step of transmitting the retransmission data block includes allocating a HARQ process number to the retransmission data block, the HARQ process number corresponding to a remainder value obtained by dividing k by N.

13. The method of claim 10, wherein the step of transmitting the (k+i)th frame includes allocating a HARQ process number to the (k+i)th frame, the HARQ process number corresponding to a remainder value obtained by dividing (k+i) by N.

14. The method of claim 10, wherein the step of adding offset includes adding a field for the offset to any one HARQ control information element of a synchronous HARQ downlink MAP information element or a synchronous HARQ uplink MAP information element.

15. The method of claim 10, wherein the step of adding offset includes adding a field for the offset to a format for allocation of an uplink shared channel (UL-SCH) in a 3GPP LTE system.

16. The method of claim 10, wherein the offset has a variable number of bits.

17. The method of claim 10, wherein the offset is the number of frames corresponding to the difference in a transmission timing point, wherein the difference is shorter than a round trip time (RTT).

* * * * *